US012786286B2

(12) United States Patent
Mishra et al.

(10) Patent No.: US 12,786,286 B2
(45) Date of Patent: Nov. 3, 2026

(54) GENERATING CONTEXT-BASED AND USER-RELATED PREDICTIONS USING ARTIFICIAL INTELLIGENCE TECHNIQUES

(71) Applicant: Dell Products L.P., Round Rock, TX (US)

(72) Inventors: Abhishek Mishra, Bangalore (IN); Vivek Bhargava, Bangalore (IN); Dev Kathuria, Greater Noida (IN)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 18/378,909

(22) Filed: Oct. 11, 2023

(65) Prior Publication Data

US 2025/0126185 A1 Apr. 17, 2025

(51) Int. Cl.
*H04L 67/564* (2022.01)
*G06N 3/08* (2023.01)
*H04L 67/50* (2022.01)

(52) U.S. Cl.
CPC ............ *H04L 67/564* (2022.05); *G06N 3/08* (2013.01); *H04L 67/535* (2022.05)

(58) Field of Classification Search
CPC ........ H04L 67/535; H04L 67/564; G06N 3/08
See application file for complete search history.

(56) References Cited

U.S. PATENT DOCUMENTS

| | | | |
|---|---|---|---|
| 9,407,717 B1 | 8/2016 | Maniscalco et al. | |
| 10,789,326 B2 | 9/2020 | Lepeska et al. | |
| 11,392,664 B1 * | 7/2022 | Merritt ................ | G06F 16/9535 |
| 11,488,032 B2 | 11/2022 | Singhal et al. | |
| 2021/0406535 A1 * | 12/2021 | Neumann ............ | G06V 30/414 |
| 2024/0257179 A1 * | 8/2024 | Lundin .............. | G06Q 30/0252 |

* cited by examiner

*Primary Examiner* — Umar Cheema
(74) *Attorney, Agent, or Firm* — Ryan, Mason & Lewis, LLP

(57) ABSTRACT

Methods, apparatus, and processor-readable storage media for generating context-based and user-related predictions using artificial intelligence techniques are provided herein. An example computer-implemented method includes determining one or more user parameters by processing information related to a user in association with at least one web application; determining context information associated with the user accessing one or more portions of the at least one web application; generating one or more predictions associated with future use of the at least one web application by the user by processing at least a portion of the one or more user parameters and at least a portion of the context information using one or more artificial intelligence techniques; and performing one or more automated actions based at least in part on the one or more predictions associated with future use of the at least one web application by the user.

17 Claims, 6 Drawing Sheets

GENERATING CONTEXT-BASED AND USER-RELATED PREDICTIONS USING ARTIFICIAL INTELLIGENCE TECHNIQUES

BACKGROUND

In many contexts, users of varying personas using multiple types of devices access websites with significant content and multiple pages. However, such an abundance of information and/or optionality can place a substantial cognitive burden on users as they navigate through content to find items of interest. For example, a user may access an enterprise website attempting to order a new device. After completing the purchase, the user may access a separate related enterprise website attempting to monitor tracking information associated with the order. Sometime later, the user may access yet another enterprise website attempting to obtain support for the device.

In connection with conventional website management techniques, however, users are typically required to navigate across website pages and content based on individual user knowledge and/or trial-and-error processes, which can be time-consuming and error-prone, and result in negative user experiences, resource wastage, decreased enterprise revenue, etc.

SUMMARY

Illustrative embodiments of the disclosure provide techniques for generating context-based and user-related predictions using artificial intelligence techniques.

An exemplary computer-implemented method includes determining one or more user parameters by processing information related to a user in association with at least one web application, and determining context information associated with the user accessing one or more portions of the at least one web application. The method also includes generating one or more predictions associated with future use of the at least one web application by the user by processing at least a portion of the one or more user parameters and at least a portion of the context information using one or more artificial intelligence techniques. Additionally, the method includes performing one or more automated actions based at least in part on the one or more predictions associated with future use of the at least one web application by the user.

Illustrative embodiments can provide significant advantages relative to conventional website management techniques. For example, problems associated with time-consuming and error-prone user processes are overcome in one or more embodiments through automatically generating context-based and user-specific predictions with respect to future use of at least one web application, and performing one or more automated actions related thereto.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
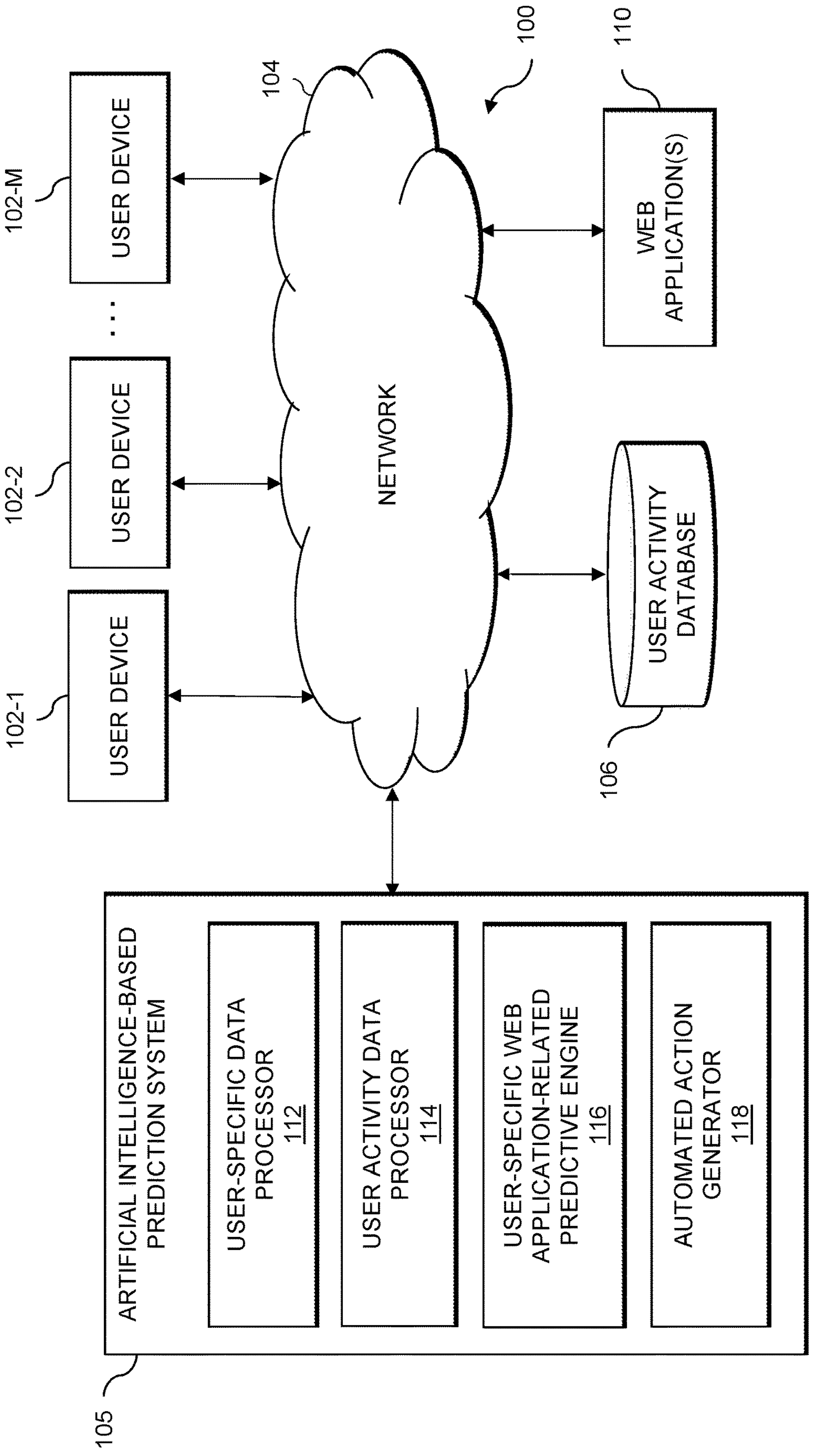
FIG. 1 shows an information processing system configured for generating context-based and user-related predictions using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is artificial intelligence-based prediction system 105 and web application(s) 110.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, artificial intelligence-based prediction system 105 can have an associated user activity database 106 configured to store data pertaining to user activity data across one or more websites and/or web applications, user data pertaining to geography, role, other parameters, etc., historical user activity data associated with similar users and/or similar web applications, etc.

The user activity database 106 in the present embodiment is implemented using one or more storage systems associated with artificial intelligence-based prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with artificial intelligence-based prediction system 105 are one or more input-output devices, which illustratively comprise keyboards, displays or other types of input-output devices in any combination. Such input-output devices can be used, for example, to support one or more user interfaces to artificial intelligence-based prediction system 105, as well as to support communication between artificial intelligence-based prediction system 105 and other related systems and devices not explicitly shown.

Additionally, artificial intelligence-based prediction system 105 in the FIG. 1 embodiment is assumed to be implemented using at least one processing device. Each such processing device generally comprises at least one processor and an associated memory, and implements one or more functional modules for controlling certain features of artificial intelligence-based prediction system 105.

More particularly, artificial intelligence-based prediction system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows artificial intelligence-based prediction system 105 to communicate over the network 104 with the user devices 102, and illustratively comprises one or more conventional transceivers.

The artificial intelligence-based prediction system 105 further comprises user-specific data processor 112, user activity data processor 114, user-specific web application-related predictive engine 116, and automated action generator 118.

It is to be appreciated that this particular arrangement of elements 112, 114, 116 and 118 illustrated in the artificial intelligence-based prediction system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for generating context-based and user-related predictions using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of artificial intelligence-based prediction system 105, user activity database 106, and web application(s) 110 can be on and/or part of the same processing platform.

An exemplary process utilizing elements 112, 114, 116 and 118 of an example artificial intelligence-based prediction system 105 in computer network 100 will be described in more detail with reference to the flow diagram of FIG. 4.

Accordingly, at least one embodiment includes generating context-based and user-related predictions using artificial intelligence techniques. As detailed herein, such an embodiment can include generating and/or implementing an artificial intelligence-based predictive mechanism to increase user engagement and/or adoptions for websites and/or applications (e.g., enterprise applications). One or more embodiments include enabling a smart loading and/or optimized page loading system which is derived based at least in part on usage pattern data, predictions pertaining to context data and user needs, and improved discoverability of relevant information for the user and the system. Such an embodiment can facilitate improved user experiences, which can result, for example, in improved conversion rates and user engagement.

As further described herein, one or more embodiments include implementing techniques for automatically loading relevant content for particular users, wherein such content has been personalized for the given users. Such an embodiment can include performing such automatic loading by tuning multiple parameters including, e.g., user type, user role, user location, etc., in conjunction with processing user-specific historical data and determining relevant contextual information.

In at least one embodiment, automatic loading of relevant content for a particular user can include improved and/or optimized web page loading (e.g., improved and/or optimized loading with respect to speed) based at least in part on the persona of the user and user-related context data. Also, in such an embodiment, the automatic loading of relevant content can also include determining and/or implementing a personalized orientation of a loaded web page (including, e.g., loading the necessary information and/or action(s) that is relevant to the user and/or meets the user's topic(s) of interest), identifying and outputting selective messaging for the user (e.g., notifications pertaining to updates on applications commonly used by the user), and continuous building of user-specific context information based at least in part on user activity, user patterns, etc.

By way merely of example, if a certain vulnerability has affected users in a given geographic region, one or more embodiments can include determining and/or inferring that users from that geographic region will attempt to access certain web pages relevant to the vulnerability (e.g., a vulnerability portal within a given enterprise application), and will be particularly seeking information related to the vulnerability. Accordingly, such an embodiment can include automatically loading, for those users, one or more of the above-noted web pages and providing and/or highlighting therein information pertaining to the vulnerability.

By way merely of additional example, consider a scenario wherein a user has recently placed an order for an asset. In such a context, at least one embodiment can include determining and/or inferring that the user will likely wish to subsequently access tracking information for that order. Accordingly, such an embodiment can include automatically loading, for the user, a web page wherein the user can obtain and/or view tracking information, and further automatically loading, within such a web page, the tracking information associated with the user's order.

With respect to web page and/or application performance, one or more embodiments include improving web page load speed and application programming interface (API) response time. To achieve such improvements, at least one embodiment includes leveraging one or more artificial intelligence techniques to filter out features of one or more web pages and/or content thereof that are not relevant to the given user's short-term and/or immediate needs or objectives. Such features can refer, for example, to functionalities that do not categorize as content, such as, e.g., triggering an action, replying to a comment, and/or other functionalities that a website offers. Accordingly, based at least in part on such filtering, one or more embodiments can include enabling, upon a user navigating to a given web page or application, the automatic loading of content which is relevant to the given user's short-term and/or immediate needs or objectives.

In addition to and/or in conjunction with such filtering, at least one embodiment can include avoiding and/or precluding outputs (to the given user) of information that is unnecessary and/or irrelevant to the given user's short-term and/or immediate needs or objectives. For example, such an embodiment can include processing alerts and user-targeted messages, and precluding the display or output (to the given user's device) based on such processing. By way of example, such alerts can refer to push notifications that can be sent to the given user based on the relevance of the information derived from the user's context. For instance, in connection with asset management software, if a user vulnerability has exceeded a certain deadline, one or more embodiments can include beginning to send one or more actionable alerts (pertaining to the vulnerability) to the user.

Also, as further detailed herein, one or more embodiments include predicting the priority of one or more given web page or application features, as well as predicting the time(s) when each such feature may be requested or accessed by a given system and/or a given user. Such predictions can be generated, as further described below and herein, using artificial intelligence techniques such as one or more time series algorithms and/or one or more neural networks (incorporating and/or used in conjunction with the Levenberg-Marquardt algorithm, for example). Additionally, at least one embodiment can also include detecting varying load on a given device and/or system at one or more particular points of time, and automatically querying a system administrator and/or initiate one or more automated system actions to scale up or scale down one or more related variables (e.g., one or more system or device infrastructure resources). Such an embodiment can include implementing specific data loading or priority-based loading if there are multiple items of content on the same web page. Priority-based loading, as used herein, refers to loading wherein user-initiated actions will take priority over prediction results, and/or loading designated high-priority content on the website before prediction results. For example, if the user clicks on a button that opens to show some content to the user, such an embodiment can include prioritizing fetching and loading that content before loading the prediction results.

One or more embodiments can additionally include analyzing specific user activity data (e.g., one or more user engagement patterns such as opening habits, timing, connected actions, etc.) and automatically sending and/or outputting to the user relevant and/or desired content based at least in part on such analysis. In at least one embodiment, such analysis is performed remotely. For example, an analytics engine can work on gathering clickstream data, and a user context repository can help to personalize experiences, target marketing campaigns, and enhance user satisfaction by capturing and analyzing user context attributes from application transactional data.

Additionally, as further detailed below and herein, one or more embodiments include deriving user context data, and generating and/or populating at least one context repository, using various forms of data related to the user and/or the web pages or applications in question (e.g., transactional data, historical data, usage data, etc.). By way of example, a user context repository can help to personalize user experiences, target marketing campaigns, and/or enhance user satisfaction by capturing and analyzing user context attributes from, e.g., application transactional data which can include any action that is performed on the application that is being logged (e.g., to capture the user footprint at the analytics engine). The personalization of user experiences can include, for example, enabling and/or displaying tailored content, recommendations, and/or user interfaces based at least in part on one or more determined user preferences and determined user behavior.

Such an embodiment as detailed above can include, by way of illustration, identifying relevant application transactional data associated with a given user, defining one or more user context attributes to analyze from such identified data, creating one or more user profiles based at least in part on the analysis, encompassing the one or more user context attributes, and updating at least a portion of the one or more user profiles with subsequent (e.g., real time) transactional data.

As also detailed herein, one or more embodiments including improving and/or optimizing a website or client application with respect to a given user. By way of example, each time the given user accesses the website or client application, such an embodiment includes processing data associated with the user's previous session, identifying the time(s) in which one or more predetermined features and/or pages of the website or client application were accessed by and/or navigated to by the user. At least one embodiment can also include supplementing such identifications and/or data processing by incorporating at least one rolling average of the user's past activity on the website or client application (e.g., a three month rolling average).

Based at least in part on such identifications and/or data processing, in conjunction with the implementation of one or more artificial intelligence-based predictive techniques, one or more embodiments can include providing the user a personalized and/or optimized website or client application experience, wherein the user is provided (via the website or client application) relevant information and/or features (e.g., by displaying and populating secondary screens in connection with one or more user needs and/or preferences). In addition to artificial intelligence techniques further detailed below (including, for example, one or more time series algorithms and one or more neural networks), at least one embodiment can include carrying out predictions such as noted above using at least one k-nearest neighbors (KNN) algorithm, which can provide that a prediction for an element should be the average of the n-closest elements to that element based on feature sets.

By way of example, a manager from an asset management team can visit an enterprise website page or portal at the end of a workday to track the status of the requests managed by the team, and is likely to perform the same activity if and/or when the manager visits the enterprise website page and/or portal any other workday during this time. Accordingly, given the time-sensitive nature of such activity, an example embodiment can include automatically loading, via the manager's user device, a snapshot of the team request statuses onto the enterprise website page and/or portal at approximately the determined timeframe.

At least one embodiment can also include improving and/or optimizing a server-side application. Such an embodiment can include, for example, determining which channels and users are performing better than others by processing data pertaining to various actions performed by a set of given users on already available features on at least one given application in connection with analyzing user profile settings. As used herein, a channel refers to a source of information for a user to obtain information on a web page through various data sources. For example, in connection with asset management software, users might mostly be looking at their system vulnerabilities using the asset management software application rather than viewing their asset requests in the asset request tracker section of the asset management software application. Based on the usage of channels, performance can be monitored, and can be analyzed specific to particular users.

Additionally, one or more embodiments include performing intelligent prioritization and regrouping of features associated with a given website or application. Such an embodiment can include identifying bandwidth or other features that fail to acquire or attract users, and assign lower prioritization weight thereto. By analyzing the content associated with user activity on a given website or application, at least one embodiment can include group features of the website or application to reduce bandwidth use and pinging frequency. Additionally, such an embodiment can include identifying one or more features and/or application type(s) most suitable for a given channel and/or a given user (e.g., primarily image-based, primarily long text-based, primarily short text-based, primarily Voice over Internet Protocol-based (VoIP-based)) based at least in part on previous engagement patterns. Further, such an embodiment can include identifying one or more geographies which perform better (than other geographies) for certain features.

At least one embodiment can also include improving and/or optimizing marketing returns. For example, such an embodiment can include using channel performance data and/or user activity data (e.g., with respect to multiple channels) to predict one or more marketing and/or campaign values. Similarly, one or more embodiments can include determining and recommending one or more channels and/or media to engage a given user with respect to one or more website or application features. For instances wherein the user is already using the website or application, such an embodiment can include implementing an in-website or in-application console or dialog, output and/or displayed to the user, providing immediate attention rather than waiting for the user to navigate through the website or application. Such an embodiment can also include implementing specific data loading and/or priority-based data loading if there are multiple items of content associated with the same web page or application portion. Further, one or more embodiments can include employing cookie sharing techniques, for example, to reduce initial loading time and incorporating a concept of single domain policy.

Figure 2:
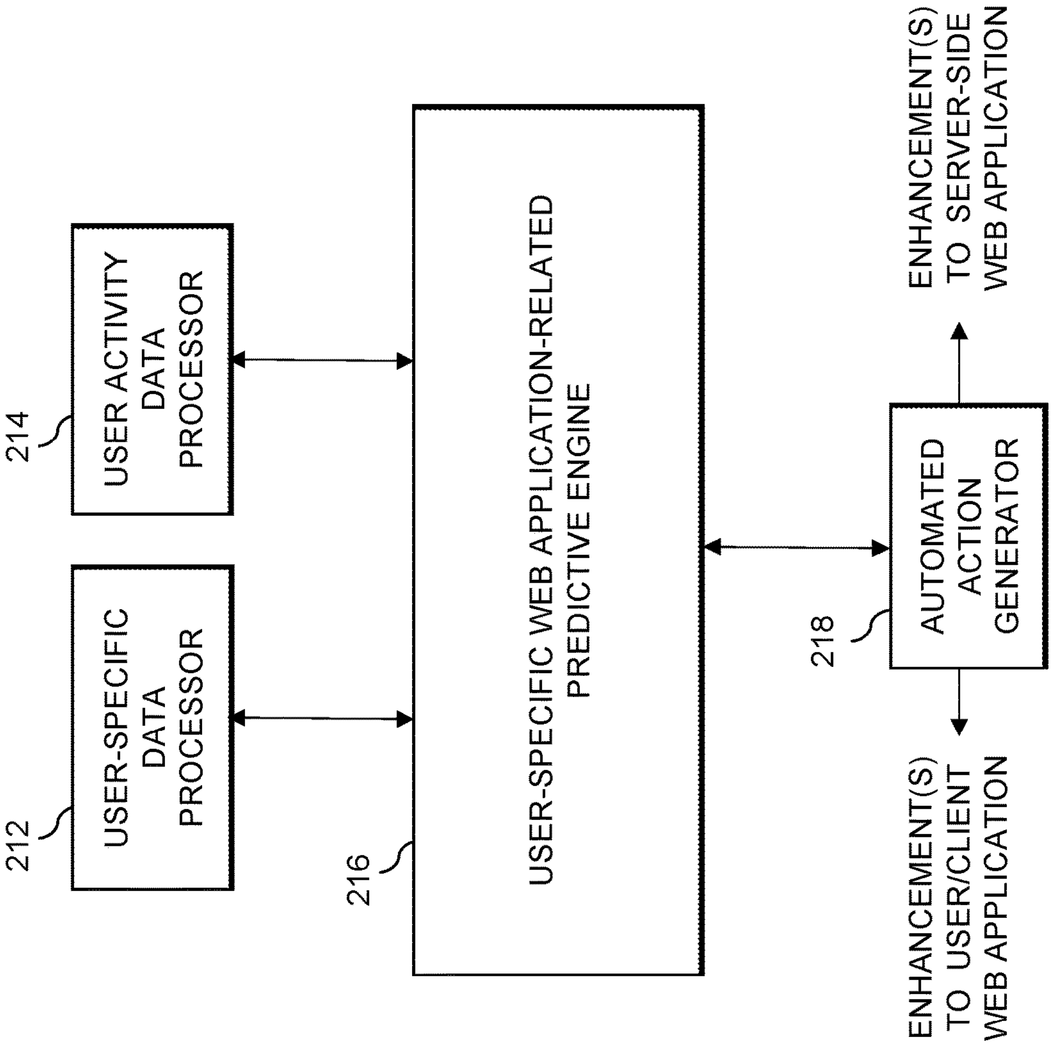
FIG. 2 shows an example workflow implementing a user-specific web application-related predictive engine in an illustrative embodiment.

FIG. 2 shows an example workflow implementing a user-specific web application-related predictive engine in an illustrative embodiment. By way of illustration, FIG. 2 depicts an optimization workflow with respect to automation and implementation of user-specific web application-related predictive engine 216, as further detailed below.

Such an embodiment can include collecting and processing data, using user-specific data processor 212, for multiple user-related parameters such as, for example, user role (e.g., administrator rights for some pages), user type (e.g., manager, developer, etc.), time spent on each page, frequency of page visits, user location, available hours of the user, device form factor, profile settings (e.g., do not disturb (DND), offline, focus mode, etc.), selection preference (e.g., segmentation via channels), transaction summary (e.g., success ratio, actions performed, ping time, grouping, etc.), user data (e.g., geo-location data, application usage data), average session time, activity data, user-specific preferences, etc.), previous version transaction summary (e.g., historical data of previous campaign), etc. Based at least in part on predictions generated as a result of processing of such data using user-specific web application-related predictive engine 216, automated action generator 218 can enhance and/or optimize a user/client web application by modifying one or more profile settings associated with the user and/or the user/client application, modifying selection preferences associated with user data, determining and/or allocating resources in accordance with available time for user sessions, etc. With respect to user/client application optimizations, consider an example wherein a manager from an asset management team checks their organizational leader board frequently at the end of the workday to track the status of the requests managed by their team, and is likely to do the same if the manager visits the portal any other workday at a similar time. Accordingly, one or more embodiments can include implementing a personalized and optimized experience for this user (i.e., the manager) on the user/client application, wherein the user would find relevant information and/or features at particular times, and one or more secondary screens can be made available based on relevant needs.

Also, as depicted in FIG. 2, such an embodiment can include collecting and processing data, using user activity data processor 214, for multiple user activity parameters and/or web application activity parameters such as, for example, user device details (e.g., for user devices used in navigating the given web application(s), dead page identification information, focus mode information pertaining to one or more users (e.g., during navigation of the given web application(s)), etc. Based at least in part on predictions generated as a result of processing of such data using user-specific web application-related predictive engine 216, automated action generator 218 can enhance and/or optimize a server-side web application by performing one or more intelligent prioritization and/or regrouping actions, recommending one or more shared cookie options, performing one or more priority loading operations, identifying useless bandwidth, etc. With respect to server-side web application optimization actions, consider an example use case involving approval software, wherein it is determined that a user's manager will likely access the software to approve a recently submitted user timesheet. Accordingly, one or more embodiments can include readying at least a portion of the approval software application for the manager to carry out the noted task in a streamlined manner (e.g., by loading the timesheet and enabling one or more related secondary screens). Similarly, in another example use case, cookie sharing can be used to identify actions on digital workflow management software to optimize the experience on asset management software. Additionally, one or more embodiments can also include implementing server-side web application optimization actions such as identifying useless bandwidth, identifying geographies that are performing well for certain features, etc., wherein data related to implementing such actions can be captured from clickstream data in connection with an analytics engine.

As detailed herein, one or more embodiments include implementing one or more artificial intelligence techniques. For example, at least one embodiment includes training and using at least one artificial intelligence-based time series algorithm (e.g., long short-term memory networks (LSTM)) to intelligently predict content and delivery times for providing the content to particular users (e.g., the most optimized delivery time(s)).

Additionally or alternatively, at least one embodiment includes training and implementing at least one neural network to predict content and/or delivery times for particular users. For example, such an embodiment includes using the Levenberg-Marquardt algorithm, also known as the damped least-squares method, to work with one or more loss functions which take the form of a sum of squared errors. In such an embodiment, the Levenberg-Marquardt algorithm can be carried out without computing an exact Hessian matrix, wherein a Hessian matrix is a tool and/or component, which organizes second-order partial derivatives of a function, and which can be used to optimize the learning process of one or more datasets, leading to faster convergence and efficient performance of the given software application. Instead, in such an embodiment, the Levenberg-Marquardt algorithm can work with a gradient vector and a Jacobian matrix, wherein a Jacobian matrix is a tool and/or component which organizes first-order partial derivatives of a function.

By way of example, in connection with predicting traffic flow on an enterprise software application, at least one embodiment can include using the Levenberg-Marquardt algorithm to predict the feature(s) of the enterprise software application being used most and obtain and/or determine user context information related thereto. If, for example, a user's device is nearing its end of life (EOL), as determined in accordance with user context information, a first set of content to be prefetched for the user can include information about the device's EOL, and a second set of content to be prefetched for the user can include asset inventory information that shows relevant device-related information.

Additionally or alternatively, at least one embodiment can also include using one or more gradient descent algorithms and/or one or more conjugate gradient algorithms in predicting content and/or delivery times for particular users.

Figure 3:
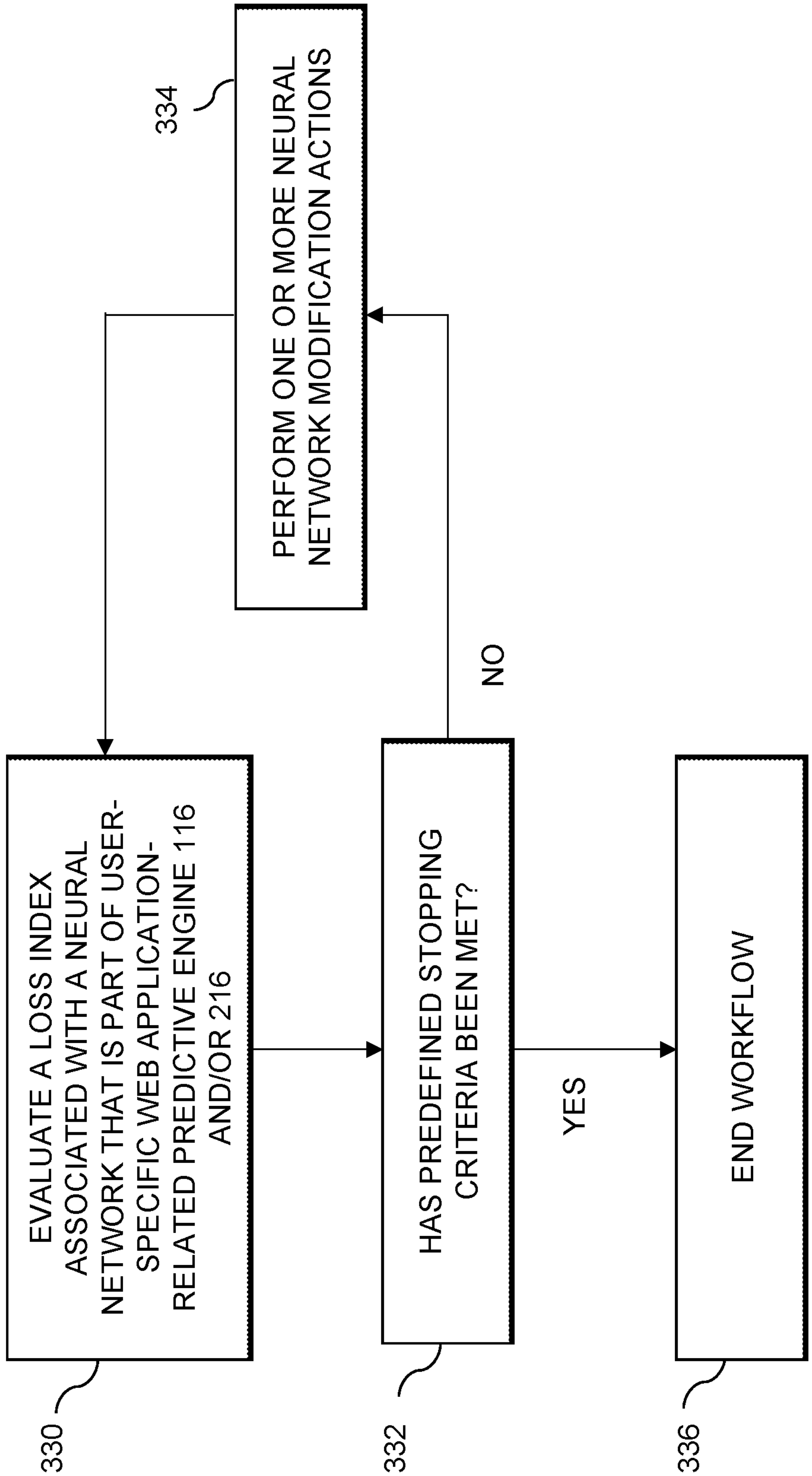
FIG. 3 shows an example workflow for training a neural network in an illustrative embodiment.

FIG. 3 shows an example workflow for training a neural network (such as, e.g., part of user-specific web application-related predictive engine 116 or 216) in an illustrative embodiment. By way of illustration, FIG. 3 depicts evaluating a loss index associated with a neural network that is part of user-specific web application-related predictive engine 116 and/or 216 in step 330, and determining if predefined stopping criteria has been met in step 332. If yes (that is, the predefined stopping criteria has been met), then the workflow ends at step 336. If no (that is, the predefined stopping criteria has not been met), then the workflow proceeds to perform one or more neural network modification actions in step 334 including, for example, improving one or more neural network parameters, calculating a gradient, calculating a Hessian approximation, updating a damping parameter, updating a damping factor, etc., before returning to step 330. In such an embodiment, a damping factor includes a component which can help in providing the optimal path and positive aspect(s) of user context in one or more types of software applications.

Accordingly, as detailed herein, one or more embodiments include enhancing the user experience in connection with at least one website and/or application by automatically loading (in the at least one website and/or application) primarily content relevant to the user by processing, using one or more artificial intelligence techniques, user-related context data. By way of example, in an enterprise environment, users often interact with multiple applications within the same domain. By analyzing various contextual factors such as, e.g., the time associated with user activity, the location associated with user activity, actions performed by the user on the at least one website and/or application, etc., at least one embodiment can learn and/or predict the user's intent and provide the user with useful options and/or information upfront upon one or more subsequent sessions on the at least one website and/or application. Such an embodiment can include improving user experience by reducing navigation time as well as cognitive load.

For example, if a user's system is nearing its end EOL, visiting a system support website or portal would be a logical step for the user to perform in the near future. As such, one or more embodiments can include predicting and/or anticipating this need by processing context data related to the EOL status of the system, and presenting, e.g., the system information along with a system refresh form to the user via the system support website or portal, in conjunction with automatically loading the system support website or portal in a subsequent user session. Additionally, such automatically presented content can highlight the need for upgrade if the user is not aware, thereby reducing efforts and improving productivity.

Accordingly, at least one embodiment includes implementing contextual prediction capabilities, which enables the anticipation of user needs and presentation of relevant options to the user via one or more particular web pages and/or applications before the user explicitly requests such content. Such an embodiment can also include improving website or application response time based at least in part on when contextually relevant user activity occurs and the channels and/or locations in which such contextually relevant user activity occurs. Also, one or more embodiments include enhancing user experience in terms of content generation based at least in part on user preferences, as well as retaining such user preferences and continuing consistent user experience across different devices.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on context data related to user activities with respect to at least one website and/or application, and such recommendations and/or predictions can be used to initiate one or more automated actions (e.g., automatically load and/or display predicted content at one or more predicted times on at least one particular website and/or application page).

Figure 4:
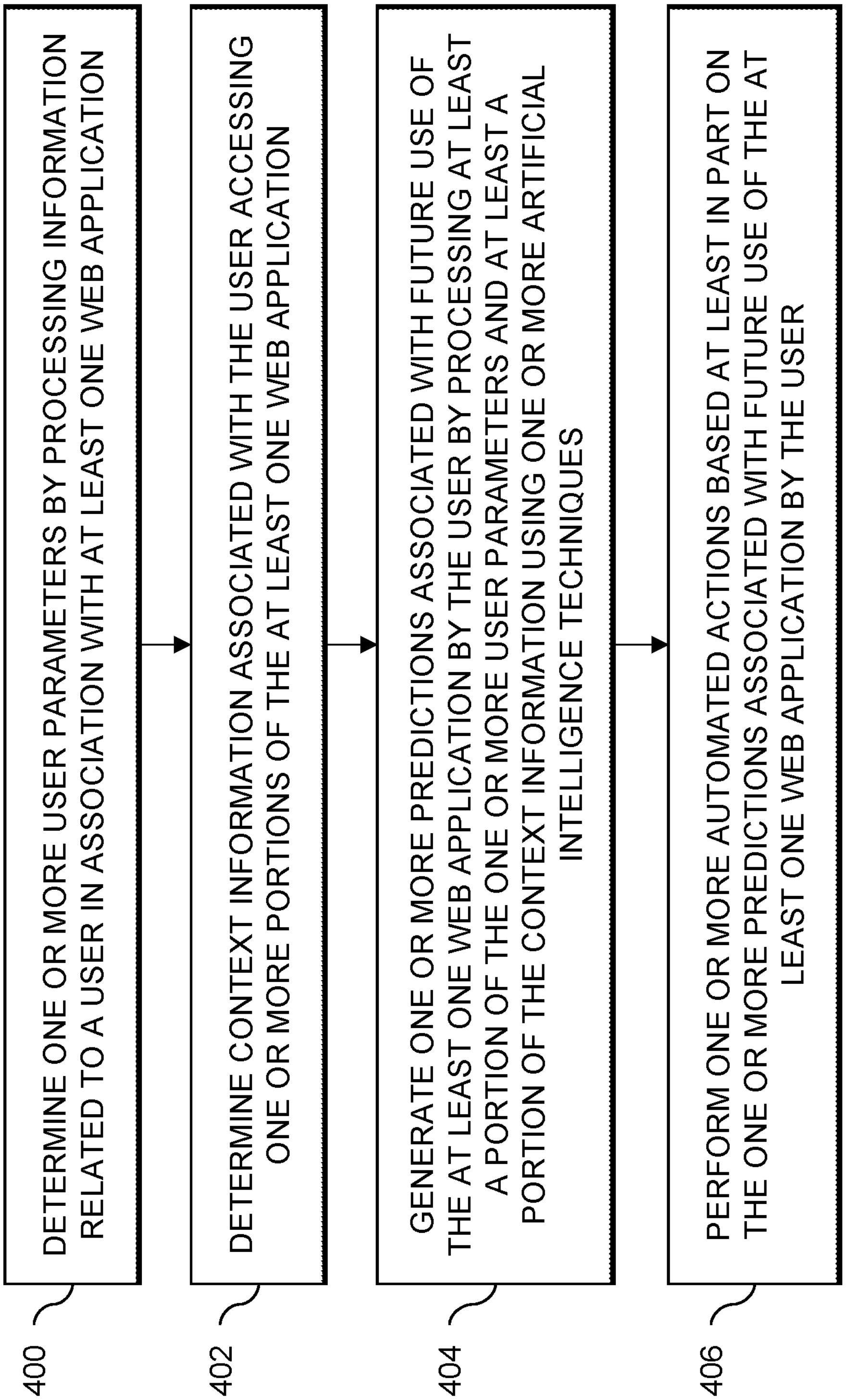
FIG. 4 is a flow diagram of a process for generating context-based and user-related predictions using artificial intelligence techniques in an illustrative embodiment.

FIG. 4 is a flow diagram of a process for generating context-based and user-related predictions using artificial intelligence techniques in an illustrative embodiment. It is to be understood that this particular process is only an example, and additional or alternative processes can be carried out in other embodiments.

In this embodiment, the process includes steps 400 through 406. These steps are assumed to be performed by artificial intelligence-based prediction system 105 utilizing elements 112, 114, 116 and 118.

Step 400 includes determining one or more user parameters by processing information related to a user in association with at least one web application. In at least one embodiment, determining one or more user parameters includes determining one or more of user type, user role, time spent on the at least one web application by the user, and user location by processing clickstream data associated with use of the at least one web application by the user.

Step 402 includes determining context information associated with the user accessing one or more portions of the at least one web application. In one or more embodiments, determining context information associated with the user accessing one or more portions of the at least one web application includes identifying, by processing historical data associated with use of the at least one web application by the user, one or more contextual factors including at least one of temporal information associated with the user accessing one or more portions of the at least one web application, location information associated with the user accessing one or more portions of the at least one web application, and activity performed by the user on the one or more portions of the at least one web application.

Step 404 includes generating one or more predictions associated with future use of the at least one web application by the user by processing at least a portion of the one or more user parameters and at least a portion of the context information using one or more artificial intelligence techniques. In at least one embodiment, generating one or more predictions associated with future use of the at least one web application by the user includes predicting content to be displayed to the user via the at least one web application by processing the at least a portion of the one or more user parameters and the at least a portion of the context information using the one or more artificial intelligence techniques. In such an embodiment, predicting content to be displayed to the user via the at least one web application can include predicting a priority value to be associated with each of multiple web pages associated with the at least one web application.

Additionally or alternatively, generating one or more predictions associated with future use of the at least one web application by the user can include predicting one or more times for delivering content to be displayed to the user via the at least one web application by processing the at least a portion of the one or more user parameters and the at least a portion of the context information using the one or more artificial intelligence techniques. In such an embodiment, predicting one or more times for delivering content to be displayed to the user via the at least one web application can include predicting at least one time when each of one or more features of the at least one web application will be accessed by the user.

Also, in at least one embodiment, generating one or more predictions associated with future use of the at least one web application by the user includes (i) predicting content to be displayed to the user via the at least one web application and (ii) predicting one or more times for delivering at least a portion of the content to be displayed to the user via the at least one web application by processing the at least a portion of the one or more user parameters and the at least a portion of the context information using at least one neural network. Such an embodiment can also include training the at least one neural network using a Levenberg-Marquardt algorithm in connection with historical user parameter data and historical context information associated with one or more users accessing one or more of the at least one web application one or more additional web applications related to the at least one web application. Additionally or alternatively, such an embodiment can also include training the at least one neural network using at least one of one or more gradient descent algorithms and one or more conjugate gradient algorithms in connection with historical user parameter data and historical context information associated with one or more users accessing one or more of the at least one web application one or more additional web applications related to the at least one web application.

Step 406 includes performing one or more automated actions based at least in part on the one or more predictions associated with future use of the at least one web application by the user. In one or more embodiments, performing one or more automated actions includes automatically loading content, via the at least one web application, in accordance with at least a portion of the one or more predictions. In such an embodiment, performing one or more automated actions can include automatically personalizing at least a portion of the content for the user prior to loading. Additionally or alternatively, performing one or more automated actions can include automatically training at least a portion of the one or more artificial intelligence techniques using feedback related to at least a portion of the one or more predictions.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate context-based and user-related predictions using artificial intelligence techniques. These and other embodiments can effectively overcome problems associated with time-consuming and error-prone user processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
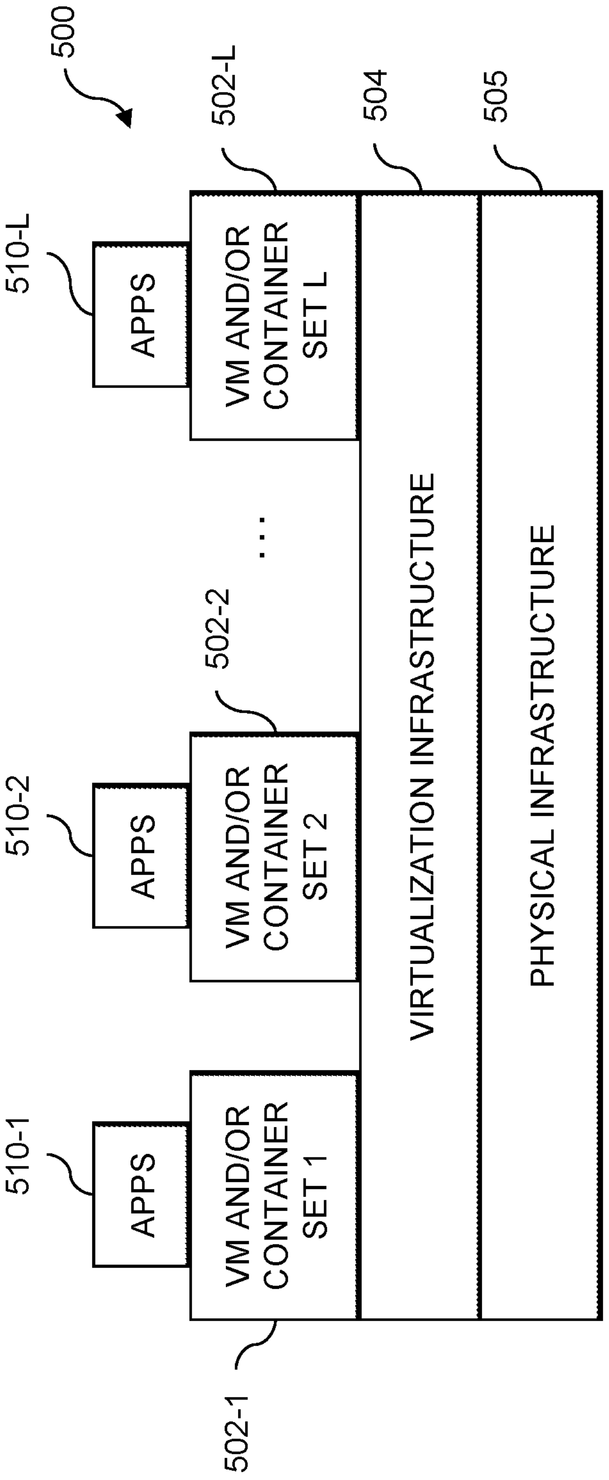
FIGS. 5 and 6 show examples of processing platforms that may be utilized to implement at least a portion of an information processing system in illustrative embodiments.
Figure 6:
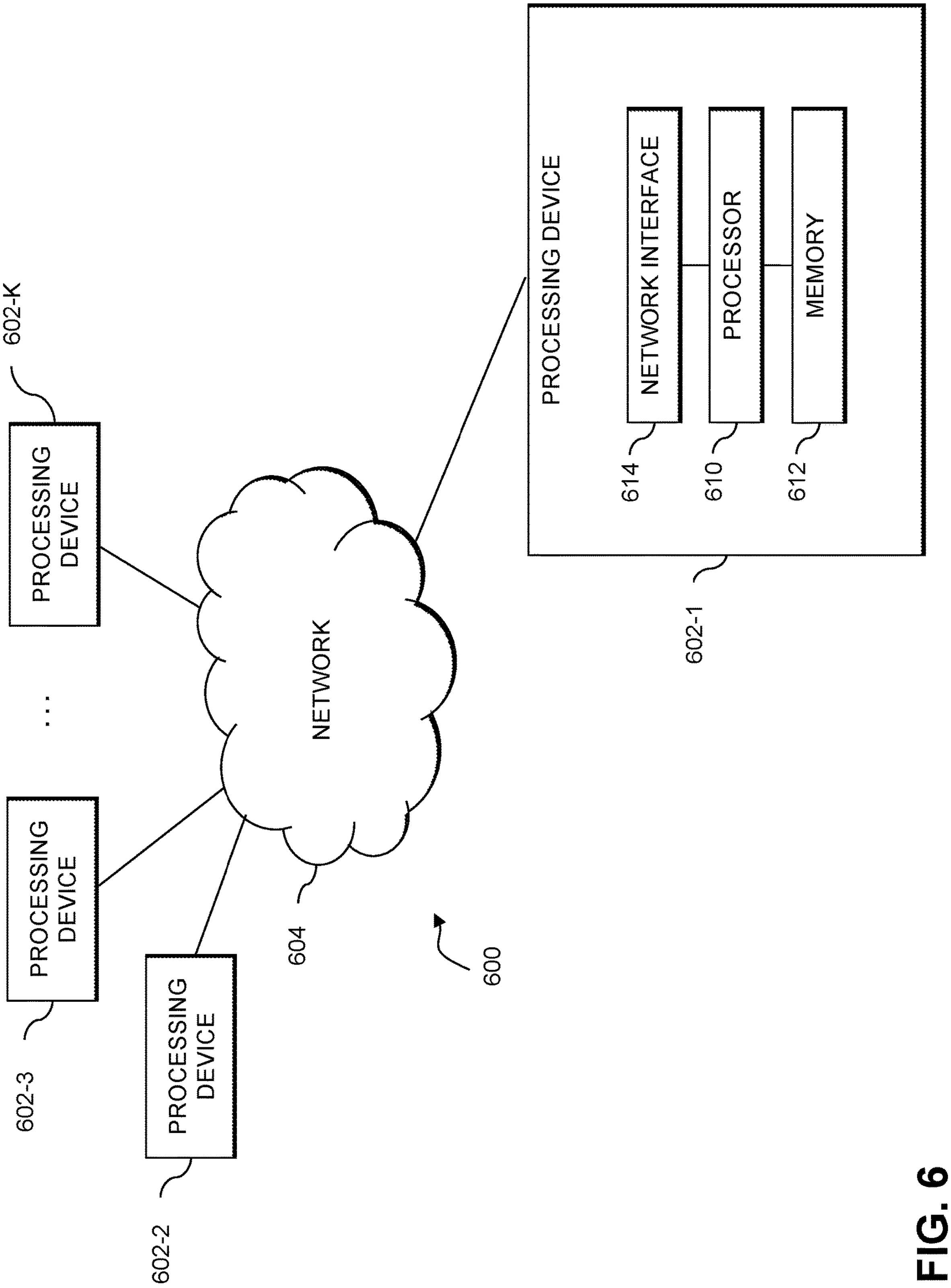

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

determining one or more user parameters by processing information related to a user in association with at least one web application;

determining context information associated with the user accessing one or more portions of the at least one web application;

training at least one neural network using one or more gradient descent algorithms and one or more conjugate gradient algorithms in connection with historical user parameter data and historical context information associated with one or more users accessing the at least one web application and one or more additional web applications related to the at least one web application;

generating one or more predictions associated with future use of the at least one web application by the user by processing at least a portion of the one or more user parameters and at least a portion of the context information using the at least one neural network, wherein generating one or more predictions associated with future use of the at least one web application by the user comprises predicting content to be displayed via the at least one web application and predicting one or more times for displaying the predicted content via the at least one web application by processing the at least a portion of the one or more user parameters and the at least a portion of the context information using the at least one neural network; and performing one or more automated actions based at least in part on the one or more predictions associated with future use of the at least one web application by the user, wherein performing one or more automated actions comprises:

automatically displaying, via the at least one web application in connection with at least one user device associated with the user, at least a portion of the predicted content at a given one of the one or more predicted times, wherein the given one of the one or more predicted times comprises a designated time range occurring on at least one day subsequent to a day on which the user accessed the one or more portions of the at least one web application for which the context information was determined;

automatically identifying and outputting, to the user, one or more notifications pertaining to one or more updates to the at least one web application; and automatically processing multiple user-targeted messages based at least in part on the one or more predictions associated with future use of the at least one web application by the user, and precluding display of at least a portion of the multiple user-targeted messages based on the processing of the multiple user-targeted messages;

wherein the method is performed by at least one processing device comprising a processor coupled to a memory.

2. The computer-implemented method of claim 1, wherein predicting content to be displayed via the at least one web application comprises predicting a priority value to be associated with each of multiple web pages associated with the at least one web application.

3. The computer-implemented method of claim 1, wherein predicting one or more times for displaying the predicted content via the at least one web application comprises predicting at least one time when each of one or more features of the at least one web application will be accessed by the user.

4. The computer-implemented method of claim 1, wherein performing one or more automated actions comprises automatically loading content, via the at least one web application, in accordance with at least a portion of the one or more predictions.

5. The computer-implemented method of claim 4, wherein performing one or more automated actions comprises automatically personalizing at least a portion of the content for the user prior to loading.

6. The computer-implemented method of claim 1, further comprising:

training the at least one neural network using a Levenberg-Marquardt algorithm in connection with historical user parameter data and historical context information associated with one or more users accessing one or more of the at least one web application one or more additional web applications related to the at least one web application.

7. The computer-implemented method of claim 1, wherein performing one or more automated actions comprises automatically training at least a portion of the at least one neural network using feedback related to at least a portion of the one or more predictions.

8. The computer-implemented method of claim 1, wherein determining one or more user parameters comprises determining one or more of user type, user role, time spent on the at least one web application by the user, and user location by processing clickstream data associated with use of the at least one web application by the user.

9. The computer-implemented method of claim 1, wherein determining context information associated with the user accessing one or more portions of the at least one web application comprises identifying, by processing historical data associated with use of the at least one web application by the user, one or more contextual factors including at least one of temporal information associated with the user accessing one or more portions of the at least one web application, location information associated with the user accessing one or more portions of the at least one web application, and activity performed by the user on the one or more portions of the at least one web application.

10. A non-transitory processor-readable storage medium having stored therein program code of one or more software programs, wherein the program code when executed by at least one processing device causes the at least one processing device:

to determine one or more user parameters by processing information related to a user in association with at least one web application;

to determine context information associated with the user accessing one or more portions of the at least one web application;

to train at least one neural network using one or more gradient descent algorithms and one or more conjugate gradient algorithms in connection with historical user parameter data and historical context information associated with one or more users accessing the at least one web application and one or more additional web applications related to the at least one web application;

to generate one or more predictions associated with future use of the at least one web application by the user by processing at least a portion of the one or more user parameters and at least a portion of the context information using the at least one neural network, wherein generating one or more predictions associated with future use of the at least one web application by the user comprises predicting content to be displayed via the at least one web application and predicting one or more times for displaying the predicted content via the at least one web application by processing the at least a portion of the one or more user parameters and the at least a portion of the context information using the at least one neural network; and to perform one or more automated actions based at least in part on the one or more predictions associated with future use of the at least one web application by the user, wherein performing one or more automated actions comprises:

automatically displaying, via the at least one web application in connection with at least one user device associated with the user, at least a portion of the predicted content at a given one of the one or more predicted times, wherein the given one of the one or more predicted times comprises a designated time range occurring on at least one day subsequent to a day on which the user accessed the one or more portions of the at least one web application for which the context information was determined;

automatically identifying and outputting, to the user, one or more notifications pertaining to one or more updates to the at least one web application; and automatically processing multiple user-targeted messages based at least in part on the one or more predictions associated with future use of the at least one web application by the user, and precluding display of at least a portion of the multiple user-targeted messages based on the processing of the multiple user-targeted messages.

11. The non-transitory processor-readable storage medium of claim 10, wherein performing one or more automated actions comprises automatically loading content, via the at least one web application, in accordance with at least a portion of the one or more predictions.

12. An apparatus comprising:

at least one processing device comprising a processor coupled to a memory;

the at least one processing device being configured:

to determine one or more user parameters by processing information related to a user in association with at least one web application;

to determine context information associated with the user accessing one or more portions of the at least one web application;

to train at least one neural network using one or more gradient descent algorithms and one or more conjugate gradient algorithms in connection with historical user parameter data and historical context information associated with one or more users accessing the at least one web application and one or more additional web applications related to the at least one web application;

to generate one or more predictions associated with future use of the at least one web application by the user by processing at least a portion of the one or more user parameters and at least a portion of the context information using the at least one neural network, wherein generating one or more predictions associated with future use of the at least one web application by the user comprises predicting content to be displayed via the at least one web application and predicting one or more times for displaying the predicted content via the at least one web application by processing the at least a portion of the one or more user parameters and the at least a portion of the context information using the at least one neural network; and to perform one or more automated actions based at least in part on the one or more predictions associated with future use of the at least one web application by the user, wherein performing one or more automated actions comprises:

automatically displaying, via the at least one web application in connection with at least one user device associated with the user, at least a portion of the predicted content at a given one of the one or more predicted times, wherein the given one of the one or more predicted times comprises a designated time range occurring on at least one day subsequent to a day on which the user accessed the one or more portions of the at least one web application for which the context information was determined;

automatically identifying and outputting, to the user, one or more notifications pertaining to one or more updates to the at least one web application; and automatically processing multiple user-targeted messages based at least in part on the one or more predictions associated with future use of the at least one web application by the user, and precluding display of at least a portion of the multiple user-targeted messages based on the processing of the multiple user-targeted messages.

13. The apparatus of claim 12, wherein predicting content to be displayed via the at least one web application comprises predicting a priority value to be associated with each of multiple web pages associated with the at least one web application.

14. The apparatus of claim 12, wherein predicting one or more times for displaying the predicted content via the at least one web application comprises predicting at least one time when each of one or more features of the at least one web application will be accessed by the user.

15. The apparatus of claim 12, wherein performing one or more automated actions comprises automatically loading content, via the at least one web application, in accordance with at least a portion of the one or more predictions.

16. The apparatus of claim 12, wherein performing one or more automated actions comprises automatically training at least a portion of the at least one neural network using feedback related to at least a portion of the one or more predictions.

17. The apparatus of claim 12, wherein determining context information associated with the user accessing one or more portions of the at least one web application comprises identifying, by processing historical data associated with use of the at least one web application by the user, one or more contextual factors including at least one of temporal information associated with the user accessing one or more portions of the at least one web application, location information associated with the user accessing one or more portions of the at least one web application, and activity performed by the user on the one or more portions of the at least one web application.

* * * * *